May 4, 1943.     H. J. WESTHAVER     2,318,119
BALL BEARING STREAMLINED SWIVEL
Filed March 23, 1942
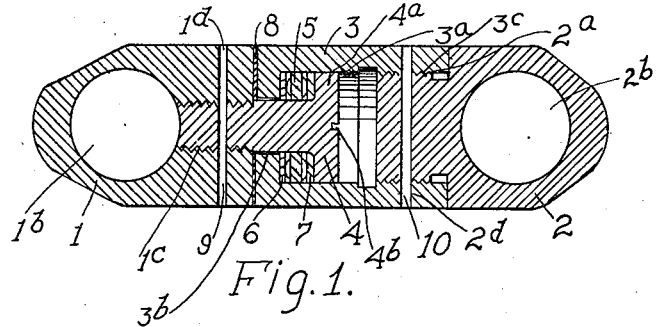
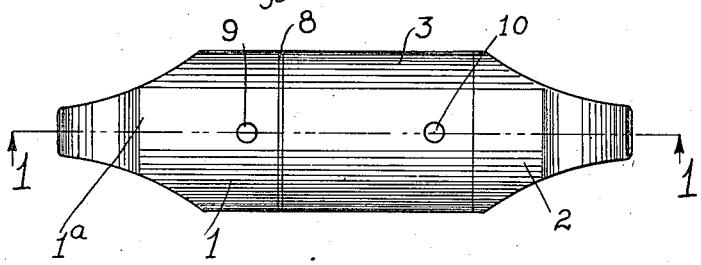
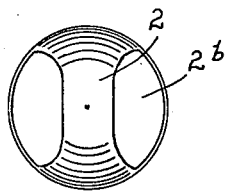
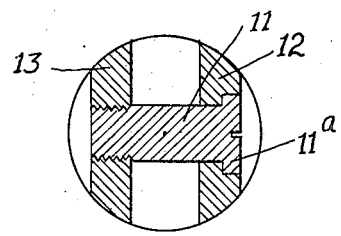
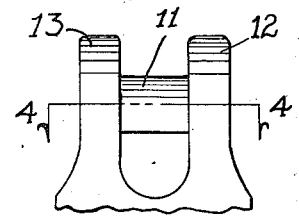
INVENTOR.
Harold J. Westhaver
BY
A. B. Bowman Patented May 4, 1943

2,318,119

UNITED STATES PATENT OFFICE 2,318,119

BALL BEARING STREAMLINED SWIVEL

Harold J. Westhaver, San Diego, Calif.

Application March 23, 1942, Serial No. 435,777

1 Claim. (Cl. 287—91)

My invention relates to a swivel that is arranged for connection with a cable, particularly a strand wire cable for drawing the cable through conduits, either underground or on poles such as telephone wires or the like and the objects of my invention are:

First, to provide a swivel of this class that is provided with ball or other bearings to facilitate the turning of one part relatively to the other under load or pressure;

Second, to provide a swivel of this class which is entirely enclosed so that it provides a reservoir for grease around the bearing and relatively movable parts;

Third, to provide a swivel of this class which is streamlined so that it will readily pass through cable conduits of different kinds and classes without catching on projections on the walls thereof;

Fourth, to provide a swivel of this class with a washer of different materials so that corrosion will not take place between two of the relatively movable parts;

Fifth, to provide a swivel of this class in which some of the parts are interlocked relatively with others by locking pins so that parts of the swivel will not be readily displaced or come apart;

Sixth, to provide a swivel of this class which is operable from either end for reversing the direction of the cable;

Seventh, to provide a swivel of this class in which a cable may be connected to opposite ends thereof; and Eighth, to provide a swivel of this class which is very simple and economical of construction, easy to operate, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claim, reference being had to the accompanying drawing which forms a part of this application in which:

Figure 1 is a longitudinal sectional view of my ball bearing streamlined swivel taken from the line 1—1 of Fig. 2; Fig. 2 is a side elevational view taken at right angles to that of Fig. 1; Fig. 3 is an end view thereof; Fig. 4 is a sectional view of one end of the swivel in slightly modified form from that of Figs. 1 to 3, inclusive, and taken from the line 4—4 of Fig. 5; Fig. 5 is a fragmentary side elevational view thereof.

Similar characters of reference refer to similar parts and portions throughout the several views of the drawing:

The end members 1 and 2, intermediate member 3, bolt member 4, bearing retainer 5, thrust washers 6 and 7, washer 8 and lock pins 9 and 10 constitute the principal parts and portions of my swivel in its preferred form.

The end member 1 is provided with a curved tapered end portion 1a in substantially streamlined shape as shown best in Figs. 1 and 2 of the drawing. It is provided with a hole 1b therethrough which is adapted to receive an end of a cable, which may be secured thereto in any conventional manner by clamping or otherwise. This member 1 is also provided with a threaded hole 1c, as shown in Fig. 1 of the drawing which extends some distance and is adapted to receive the threaded end of the bolt 4 which is screwthreaded therein. In order to lock the member 1 in its relation with the bolt 4 there is provided a locking pin 9 which fits in a hole 1d extending through the member 1 through the bolt 4, the pin 9 being secured tightly in the hole 1d. This bolt 4 is provided with a large head 4a which is provided with a slot 4b for turning or holding the bolt while turning the member 1 in relation thereto. This bolt 4 is revolubly mounted in a bore 3a in the intermediate member 3. This member 3 is provided with a reduced hole 3b at its one end and positioned between the end of the member 3 and the end of the member 1 is a washer 8 which fits over the bolt 4. This washer 8 is preferably made of bronze so that corrosion does not take place between the members 1 and 3. Positioned between the head of the bolt 4 and the end of the member 3 is a ball retainer in which balls are mounted for bearings and on opposite sides of this ball retainer and balls are thrust bearings 6 and 7 which may be made of material to provide adequate wear for the ball bearing, it being here noted that tapered roller bearings may be used instead of ball bearings between these thrust bearings 6 and 7 if desired. The opposite end of the member 3 is open and provided with threads 3c in which is screwthreaded the screw-threaded reduced portion 2a of the end member 2 and after it is tightly positioned therein it is locked by means of a pin 10 in a hole 2d in the member 2 which extends through the screw-threaded portions 2a of the end member 2. This end member 2 is substantially the same shape and streamlined form as the end member 1b at its extended end, as shown best in Figs. 2 and 3 of the drawing. The space between the end of the screw-threaded portion 2a and the opposite end of the member 3 is filled with suitable grease for lubricating the movable interior parts of the swivel including the bearings.

It will be here noted that the ends 1 and 2, as shown in Figs. 1 to 3, inclusive, are closed and the cables secured at these opposed ends must be passed through the loop at its end and then clamped, while in Figs. 4 and 5 there is provided a structure which is substantially the same except that the end is open and there is provided a bolt 11, as shown in Figs. 4 and 5 which is provided with a head 11a which is countersunk in one side 12 and is screw-threaded in the other side 13 and this bolt may be removed and a looped end of the cable may be inserted therein and the bolt replaced, which might be more desirable for some purposes.

The operation of my swivel is substantially as follows: A drawing cable is secured to one end and a drawn cable secured to the other end of the swivel in the holes 1b and 2b respectively, it being noted that the swivel may be drawn through the conduit or other place where it is used in either direction. The members 2 and 3 will remain stationary while the member 1, together with the bolt 4 may revolve relatively thereto to prevent the twisting of the cables as the bearings form easy relative movement of the relative moving parts.

Though I have shown and described a particular construction, combination and arrangement of parts and portions and certain modifications thereof, I do not wish to be limited to this particular construction, combination and arrangement, nor to the modification but desire to include in the scope of my invention the construction, combination and arrangement substantially as set forth in the appended claim.

Having thus described my invention, what I claim as new and desire to secure by Letters Patent is:

In a cable connecting swivel of the class described, the combination of a substantially cup-shaped intermediate member, an end member secured in the open end thereof, a bolt provided with a relatively large head revolubly mounted in said intermediate member and extending outwardly through the substantially closed end thereof, another end member secured on the extending end of said bolt, each of said end members provided with looped portions arranged to receive a cable, ball bearing means between the head of said bolt and the substantially closed end of said intermediate member, pin means for interlocking said intermediate member with one of said end members, pin means for interlocking said bolt with one of said end members, and a bearing washer interposed between said intermediate member and the relatively movable end member.

HAROLD J. WESTHAVER.